Patented Mar. 13, 1923.

1,448,284

UNITED STATES PATENT OFFICE.

ALONZO C. TUTT, OF GALENA, KANSAS, AND LEVI F. SNELSON, OF JOPLIN, MISSOURI.

PAINT.

No Drawing.   Application filed September 5, 1922.   Serial No. 586,323.

*To all whom it may concern:*

Be it known that we, ALONZO C. TUTT and LEVI F. SNELSON, citizens of the United States, residing at Galena, in the county of Cherokee and State of Kansas, and Joplin, in the county of Jasper and State of Missouri, have invented certain new and useful Improvements in Paints, of which the following is a specification.

This invention relates to paint, and more particularly to non-corrosive paint.

An object of the invention is the provision of a hard drying, impervious composition for the preservation of wood and metal.

A further object of the invention is the provision of a non-corrosive paint formed principally of metallic oxides oxidized by natural processes, mixed in such proportions that they will react on each other and form a pigment of substantially indestructible nature.

A further object is the provision of a paint consisting of such metallic oxides combined with suitable adhesive, pliable and surface finishing materials.

A further object of the invention is the provision of a preservative for wood and metal of greater durability than similar preparations now in use, and cheaper to manufacture.

The composition consists of dry ferric oxide, dry zinc oxide, and dry copper oxide, the zinc oxide and copper oxide being present in substantially equal proportions and the ferric oxide being present in the proportion of about seven times by weight the amount of zinc oxide present. This mixture is added to linseed oil, or other paint oil containing a small amount of dissolved rubber. A small quantity of raw amber is also added to the oil before the pigment is dissolved therein.

In a typical embodiment of the invention 70 pounds of dry ferric oxide, 10 pounds of dry zinc oxide, and 10 pounds of copper oxide are thoroughly mixed, sifted and ground in a dry state to form the pigment. The fluid to which the pigment is added is separately prepared and requires about 60 pounds of raw linseed oil for the amount of pigment set forth. A small quantity of oil, from 5 to 10 pounds, is placed in a separate vessel and approximately 1 to 5 pounds of rubber is added thereto and the mixture heated until the rubber melts and amalgamates with the oil. This mixture is then strained and allowed to cool after which it is thoroughly mixed with the main body of raw linseed oil. Waste rubber, such as old automobile tires and the like may be used for the purpose above described, and the zinc oxide usually found in such tires is not objectionable. Approximately 1 pound of raw amber is then dissolved in a small quantity of raw linseed oil and thoroughly mixed with the main body of the oil. We have found that the proportion of amber used may vary from .5 of a pound to 2 pounds. After the oil has been finally prepared, the pigment is added thereto and the whole thoroughly mixed and reground. The amount of linseed oil used may be varied within wide limits to give the product the required consistency for spreading easily and evenly. We do not wish to be limited to the proportions of linseed oil to be employed, as different users desire paints of different consistency and the pigment and oil will be mixed in the same manner as is generally employed in mixing similar paints and more or less oil may be employed, according to the wishes of the particular user.

The proportion of oxides employed may be varied within certain limits. The amount of zinc oxide and copper oxide employed should, however, be substantially equal and the ferric oxide should be present in at least four times the quantity of either of the other oxides.

The rubber employed gives the product an adhesive quality while the amber gives gloss to the paint.

While we have described in detail the preferred practice of our process, it is to be understood that the details of procedure, and proportion of ingredients may be widely varied, and that known chemical equivalents may be employed in place of the materials mentioned, without departing from the spirit of the invention or the scope of the subjoined claims.

We claim:

1. A paint comprising a pigment formed of ferric oxide, zinc oxide and copper oxide, the ferric oxide being present in excess of the combined quantity of zinc oxide and copper oxide, and oil containing a small quantity of rubber.

2. A paint comprising a pigment formed of ferric oxide, zinc oxide, and copper oxide, the ferric oxide being present in excess of the combined quantity of zinc oxide and copper oxide, an oil, a small quantity of rubber, and a small quantity of amber.

3. A paint comprising a pigment formed of ferric oxide, zinc oxide, and copper oxide, the zinc oxide and copper oxide being present in substantially equal proportions and the ferric oxide being present in excess of the combined quantity of zinc oxide and copper oxide, and an oil containing a small quantity of rubber.

4. A paint comprising a pigment formed of ferric oxide, zinc oxide, and copper oxide, the zinc oxide and copper oxide being present in substantially equal proportions and the ferric oxide being present in excess of the combined quantity of zinc oxide and copper oxide, and an oil containing a small quantity of rubber and a small quantity of amber.

5. A paint comprising a pigment formed of substantially 70 parts by weight of ferric oxide, 10 parts of zinc oxide, and 10 parts of copper oxide, and substantially 60 parts by weight of linseed oil containing a small quantity of rubber and a small quantity of amber.

In testimony whereof, we affix our signatures in presence of two witnesses.

ALONZO C. TUTT.
LEVI F. SNELSON.

Witnesses:
J. F. MORGAN,
FRANK MORGAN.